US009425856B2

(12) United States Patent
Chini et al.

(10) Patent No.: US 9,425,856 B2
(45) Date of Patent: Aug. 23, 2016

(54) SYSTEM AND METHOD FOR MULTI-DIMENSIONAL MODULATION SCHEMES WITH HIGH NOISE IMMUNITY AND LOW EMISSION IDLE SIGNALING FOR AUTOMOTIVE AREA NETWORKS

(71) Applicant: Broadcom Corporation, Irvine, CA (US)

(72) Inventors: Ahmad Chini, Mission Viejo, CA (US); Mehmet Vakif Tazebay, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/557,777

(22) Filed: Dec. 2, 2014

(65) Prior Publication Data
US 2015/0207539 A1    Jul. 23, 2015

Related U.S. Application Data

(60) Provisional application No. 61/928,493, filed on Jan. 17, 2014.

(51) Int. Cl.
H04B 3/30 (2006.01)
H04L 12/40 (2006.01)
H04L 27/34 (2006.01)

(52) U.S. Cl.
CPC ........ *H04B 3/30* (2013.01); *H04L 12/40* (2013.01); *H04L 27/345* (2013.01); *H04L 27/3405* (2013.01); *H04L 2012/40273* (2013.01)

(58) Field of Classification Search
CPC ....... H04L 1/0042; H04L 1/006; H04L 27/00; H04L 25/03866; H04L 27/2614; H04L 12/40; H04L 27/3405; H04L 27/345; H04L 2012/40273; H04B 3/30
USPC ......................................... 375/257, 295, 316
See application file for complete search history.

(56) References Cited

U.S. PATENT DOCUMENTS

2002/0080867 A1    6/2002 Abbas et al.
2003/0039306 A1*   2/2003 Redfern ............... H04L 1/0042
                                                  375/222

(Continued)

FOREIGN PATENT DOCUMENTS

CA    2267587 A1 * 10/1999  ............... H04B 3/32
EP    1341354       9/2003
WO    WO-03/098892  11/2003

OTHER PUBLICATIONS

Karlsson M et al., "Four-dimensional optimized constellations for coherent optical transmission systems", 36th European Conference and Exhibition on Optical Communication: (ECOC 2010); Torino, Italy, Sep. 19-23, 2010, IEEE, Piscataway, NJ, USA, Sep. 19, 2010, pp. 1-6, XP031790000.

(Continued)

*Primary Examiner* — Freshteh N Aghdam
(74) *Attorney, Agent, or Firm* — Foley & Lardner LLP; Christopher J. McKenna; Angela D. Murch

(57) ABSTRACT

System, method and apparatus for multi-dimensional modulation schemes with high noise immunity and low emission idle (LEI) signaling for automotive area networks. An extra zero constellation point can be used during an idle mode and extra constellation points can be assigned to control signals.

24 Claims, 11 Drawing Sheets

(56) References Cited

U.S. PATENT DOCUMENTS

| | | |
|---|---|---|
| 2004/0128610 A1 | 7/2004 | Wei |
| 2009/0282277 A1* | 11/2009 | Sedarat ................ G06F 1/3209 713/320 |
| 2011/0022699 A1* | 1/2011 | Powell ................. G06F 1/3209 709/224 |
| 2011/0188554 A1* | 8/2011 | Kozek ................. H04L 27/2614 375/222 |
| 2012/0320771 A1* | 12/2012 | Chini ..................... H04L 12/12 370/252 |

OTHER PUBLICATIONS

Wei L-F: "Trellis-coded modulation with multidimensional constellations," IEEE Transactions on Information Theory, IEEE Press, USA, vol. IT-33, No. 4, Jul. 1, 1987, pp. 483-501, XP000979357.

European Search Report for EP 14004437.1 mailed May 28, 2015.

* cited by examiner

SYSTEM AND METHOD FOR MULTI-DIMENSIONAL MODULATION SCHEMES WITH HIGH NOISE IMMUNITY AND LOW EMISSION IDLE SIGNALING FOR AUTOMOTIVE AREA NETWORKS

This application claims the benefit of and priority to provisional application No. 61/928,493, filed Jan. 17, 2014, which is incorporated herein by reference in its entirety.

BACKGROUND

Field of the Invention

The present disclosure relates generally to data transmission and, more particularly, to a system, method and apparatus for multi-dimensional modulation schemes with high noise immunity and low emission idle (LEI) signaling for automotive area networks.

INTRODUCTION

High speed Ethernet technologies are being considered in IEEE 802.3 bp Reduced Twisted Pair Gigabit Ethernet (RT-PGE), also known as 1000BASE-T1. Unshielded Twisted Pair (UTP) cables are of special interest in automotive applications because of cost and longevity in automotive environment. A major challenge for operating at Gigabit speed over UTP cables is Electro Magnetic Compatibility (EMC) for low emission and high immunity to radio interferences.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which.

DETAILED DESCRIPTION

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

In applying Ethernet technology to automotive networks it is recognized that the unique challenges of automotive networks and applications differs from that of conventional Ethernet networks and applications. More and more new electronic devices are being used in an automotive environment. For example, navigation, telematics, TV/Radio/CD/DVD, rear-seat entertainment (RSE), cameras, and other electronic communication devices are becoming standard in an automotive vehicle.

Figure 1:
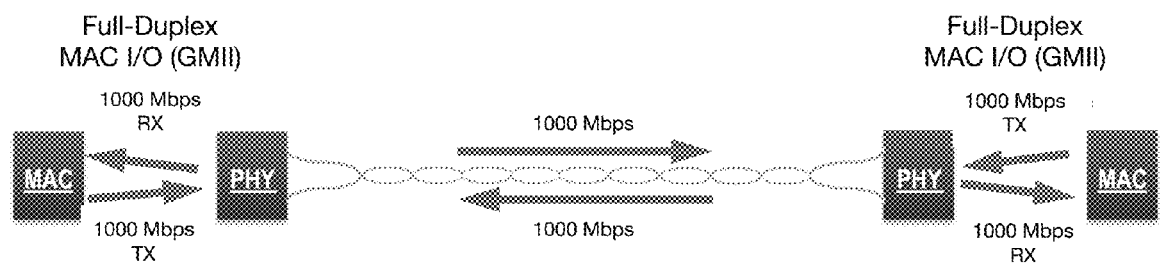
FIG. 1 illustrates an example of an Ethernet link in an automotive application.

FIG. 1 illustrates an example of an Ethernet link in an automotive application. As illustrated, a single twisted wire pair can be used to support a 1000BASE-T1 automotive physical layer device (PHY). An advantage of such a single twisted wire pair PHY is that it can leverage Ethernet technology that is already proven in IEEE-standard BASE-T PHYs. For example, a standard media access control (MAC) gigabit media independent interface (GMII) can be used with PHY/media independency. Further advantages include the support of higher data rates, high noise immunity, cost-effective cabling/connectors, etc.

Figure 2:
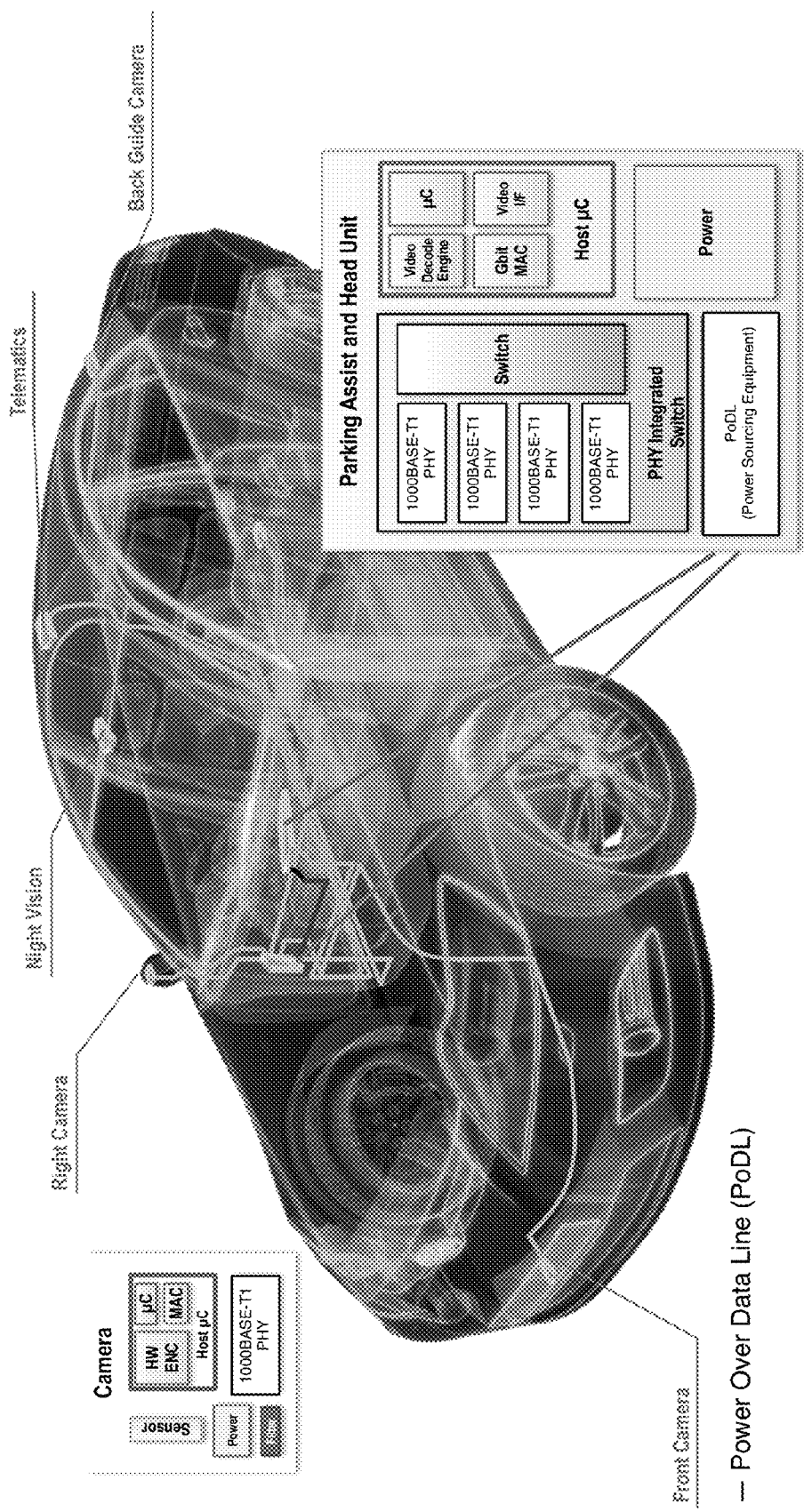
FIG. 2 illustrates an example automotive networking application.

FIG. 2 illustrates an example automotive networking application. As illustrated in this example, an automotive vehicle network can be used to connect various components such as a parking assist and head unit, one or more camera units, a night vision sensor unit, and a telematics unit. As would be appreciated, other automotive networking applications can include various other electronic communication devices to facilitate control or other infotainment purposes.

As illustrated, the parking assist and head unit can include a PHY integrated switch that includes multiple PHYs that can each be configured for communication with a different unit (e.g., a camera unit). The connectivity between a head end and multiple units can be referred to as partial networking.

For automotive applications, there are many sources for radio interference including; Citizen band Radios, Ham Radios, Short wave transmitters, TV transmitters, Digital Audio Broadcasting, Mobile base stations and radio transceivers on Emergency vehicles. Significant noise voltage may be coupled into the UTP cable operating at Gigabit speed. Typically, higher rate transmission is subject to more radio interference because the balance of cables and connectors is worse at higher frequencies. UTP cables, connectors and magnetics are designed as such to minimize the noise at the receiver. The remainder noise is expected to be tolerated or rejected by PHY transceiver and system design.

PHY designs desire to mitigate radio interference while controlling its own radio emission. The emission limits do not allow transmitting signals at more than certain levels. To allow rejecting radio interference, wide band modulation techniques are used with bandwidth significantly larger than the radio interferences. Narrow band interference can then be rejected with proper adaptive signal processing techniques. The amount of noise that can be tolerated or rejected is in part dependent on the modulation scheme itself.

2-level pulse amplitude modulation (PAM2) provides the highest noise immunity (compared to higher level modulation schemes such as PAM4, PAM8, etc.) given its largest signal Euclidean distance for automotive cables. In the present disclosure, it is recognized that extra constellation points can be used to allow some control signaling, for example, to indicate if the signal is an idle or data signal or to indicate a start and an end of data streams. Further with respect to the present disclosure, it is desired to provide an extra signal point in a constellation without affecting the minimum Euclidean distance or increasing the signal bandwidth. Higher Euclidean distance results in higher noise immunity and thus, a more reliable solution. Accordingly, further with respect to the present disclosure, it is desired that the extra signal point have zero energy, thereby allowing lower emission during an idle mode as well as allowing a smoother transition from and to Low Emission Idle (LEI) mode where a zero signal is sent.

As will be described in greater detail below, an example four-dimensional modulation scheme can be proposed that provides for an extra zero signaling without affecting the minimum Euclidean distance. The modulation format provides for high noise immunity while allowing LEI mode. LEI mode for other modulation examples are also discussed below, albeit at lower noise immunity.

Figure 3:
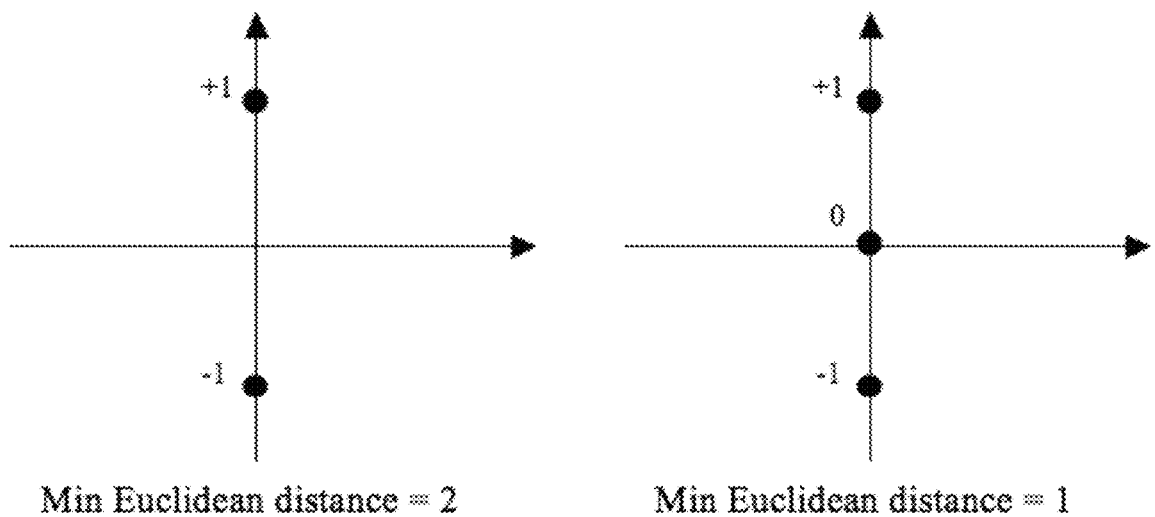
FIG. 3 illustrates an example of signal constellations for PAM2 and PAM3 modulations.

FIG. 3 illustrates a PAM2 signal constellation with constellation points +1 and −1. In the present disclosure, it is recognized that PAM3 signaling with constellation points +1, 0 and −1 can be viewed as a PAM2 signal constellation with an extra constellation point at zero. As illustrated, the minimum signal distance is 2 units for a PAM2 signal constellation and 1 unit for a PAM3 signal constellation. The minimum Euclidean distance is lower in the PAM3 signal constellation as compared to the PAM2 signal constellation.

Figure 4:
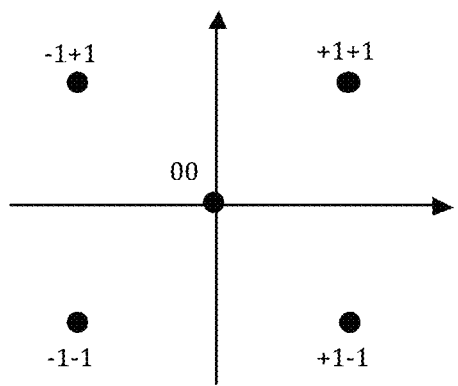
FIG. 4 illustrates an example of a two-dimensional signal constellation with the origin used as an extra constellation point.

FIG. 4 illustrates an example of a two-dimensional (2D) signal constellation with the constellation origin used as an extra signal constellation point. In this example, the 2D modulation comprises two consecutive symbols, each at three levels of +1, 0 or −1. Not all symbol combinations are used, however, as only 5 constellation points out of 9 available symbol combinations are used. This modulation scheme can be referred to as a 2D 5-Point constellation. As illustrated, this modulation scheme has a minimum Euclidean distance of sqrt(2) or about 1.41 units. This minimum Euclidean distance of 1.41 in the 2D 5-Point constellation is still less than the minimum Euclidean distance of 2 in the PAM2 signal constellation.

Figure 5:
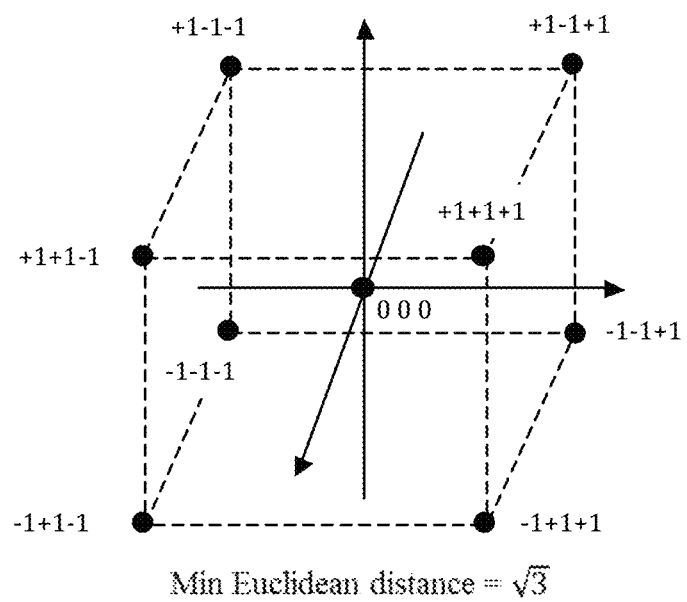
FIG. 5 illustrates an example of a three-dimensional signal constellation with the origin used as an extra constellation point.

In accordance with the present disclosure, this concept can be extended to an example three-dimensional (3D) constellation illustrated in FIG. 5. As illustrated, the minimum Euclidean distance is increased to sqrt(3) or about 1.73 units. Here, it should be noted that although the minimum Euclidean distance is improved as compared to a 2D constellation, the minimum Euclidean distance is still less than the minimum Euclidean distance of 2 in the PAM2 signal constellation.

In accordance with the present disclosure, this concept can be extended still further to an example four-dimensional (4D) constellation as shown in Table 1 below. In this example 4D 17-Point constellation, the minimum Euclidean distance is increased to sqrt(4) which is 2. This minimum Euclidean distance is the distance from the origin point (0 0 0 0) to any other constellation points shown in Table 1. In the present disclosure, it is recognized that this 4D 17-Point modulation scheme provides the same minimum Euclidean distance as PAM2 modulation.

If four consecutive PAM2 symbols are used, the total signal space would have had 16 constellation points. With the 4D 17-Point modulation, on the other hand, four consecutive symbols with symbol levels of +1, 0 or −1 are sent over. Only 17 combinations out of 81 signal constellation points are used.

TABLE 1

4D_17Point constellation

+1 +1 +1 +1
+1 +1 +1 −1
+1 +1 −1 +1
+1 +1 −1 −1
+1 −1 +1 +1
+1 −1 +1 −1
+1 −1 −1 +1
+1 −1 −1 −1
0 0 0 0
−1 +1 +1 +1
−1 +1 +1 −1
−1 +1 −1 +1
−1 +1 −1 −1
−1 −1 +1 +1
−1 −1 +1 −1
−1 −1 −1 +1
−1 −1 −1 −1

In the present disclosure, it is recognized that the 0000 symbol need not be used for data. In one embodiment, the 0000 symbol can be used during idle mode or whenever control signals need to be communicated. In one example, two consecutive 4D 17-Point symbols can be combined yielding a total signal space of 17*17=289 constellation points. Out of these 289 constellation points, 256 constellation points can be assigned for data (8 bits), one constellation point can be used to send zero (0000 0000) and 32 more constellation points can be made available for control signals.

Figure 6:
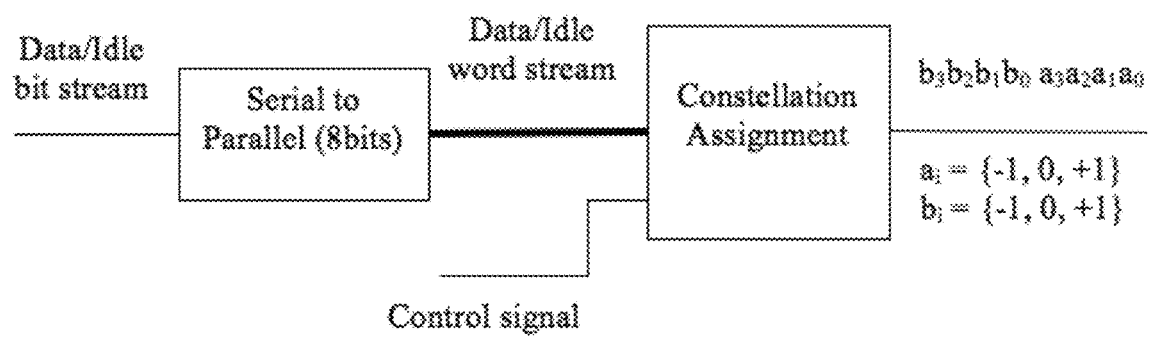
FIG. 6 illustrates an example of a 4D 17-point modulator block diagram.

FIG. 6 illustrates an example of a modulator block diagram that can be used to generate 4D 17-Point symbols. As illustrated, the lower 4-bits in each data word can be used to map one of the 16 non-zero points in the 4D 17-Point symbol ($a_3 a_2 a_1 a_0$) and the higher O-bits are used to map the second symbol ($b_3 b_2 b_1 b_0$). As would be appreciated, receivers would include demodulators that correspond to the modulators in decoding the multi-dimensional modulations.

There are many more combinations of the 4D 17-Point symbols when considering more than two consecutive symbols. The combined symbols may be used to distinguish various types of data, control or idle signals.

With the 4D 17-Point modulation, zero symbols are sent during silent periods. It is a feature of the present disclosure that the transient between data and idle modes is smooth as zero is part of the defined 4D 17-Point signal constellation.

As would be appreciated, the other modulation formats can be used with a zero in the signal constellation. For example, a 2D 9-Point modulation scheme having two consecutive PAM3 symbols can be used. Here, it should be noted that the 2D 9-Point (or 2D PAM3) modulation scheme would have reduced noise immunity as compared to the 4D 17-Point modulation scheme described above.

Figure 7A:
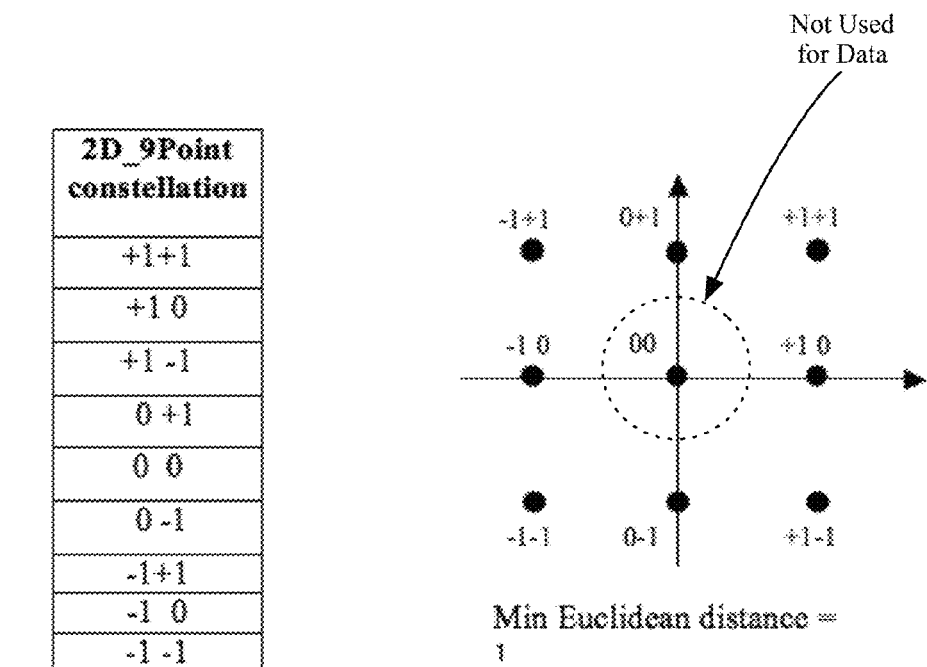
FIGS. 7A and 7B illustrate examples of a 2D 9-point constellation and modulator block diagram.
Figure 7A:
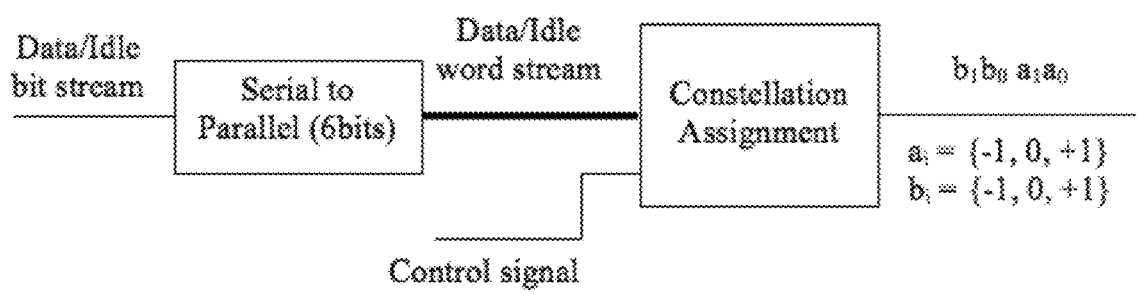

FIG. 7A shows the example 2D PAM3 constellation and the corresponding modulator block diagram. As illustrated, the 00 symbol is not used for data. Rather, the 00 symbol can be used during idle mode or whenever control signals need to be communicated. When two consecutive 2D PAM3 symbols are combined, a total signal space of 9*9=81 constellation points are generated. Out of these 81 constellation points, 64 points can be assigned for data use (6 bits), one constellation point is used to send zero (00 00) and 16 more constellation points are available for control signals.

As illustrated in the modulator block diagram of FIG. 7A, the lower 3-bits in each data word (6 bits) are used to map one of the 8 non-zero points in the 2D PAM3 symbol ($a_1 a_0$) and the higher 3-bits are used to map the second symbol ($b_1 b_0$).

Here, it should be noted that the minimum distance for the 2D 9-Point constellation is half of that of the 4D 17-Point constellation, thereby reducing noise immunity. The extra noise margin for the 4D 17-Point constellation can mainly be achieved when shorter cables with larger bandwidths are used. For longer cables, the higher cable loss for the 4D 17-Point constellation with wider bandwidth may reduce the noise margin. It should be noted that the transmit bandwidth for 4D 17-Point constellation is 50% more than the 2D 9-Point constellation.

When there is no data to be sent, the PHY generates idle signals. Idle signals can be used to keep training the receiver when there is no data on the link. Conventional Ethernet technology provided continuous idle signals. To reduce power during idle mode, Energy Efficient Ethernet (EEE) systems can be configured to produce idle signals periodically for a short period of time followed with a longer silent period.

Figure 7B:
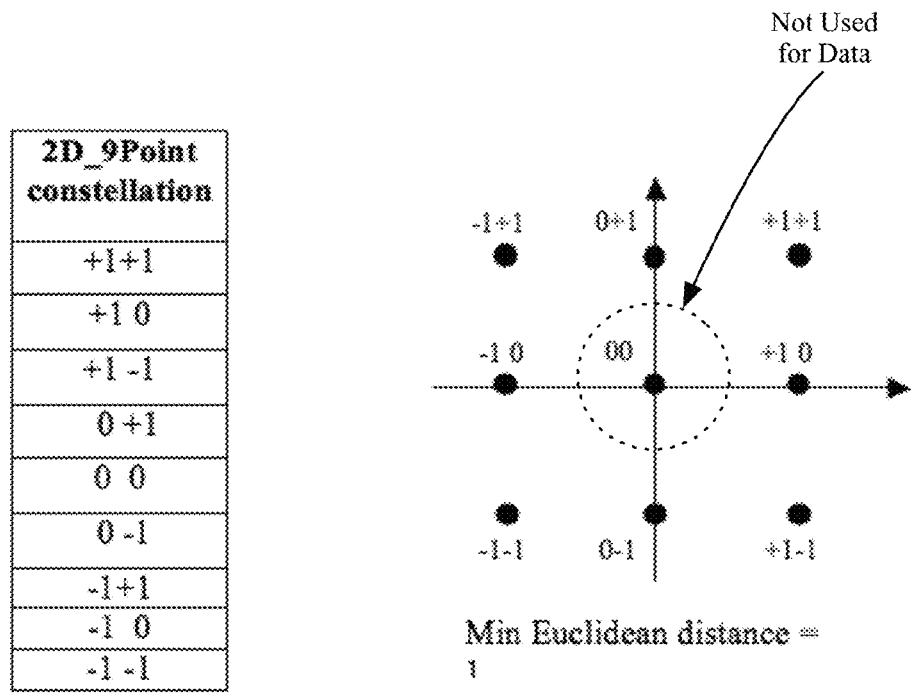
Figure 7B:
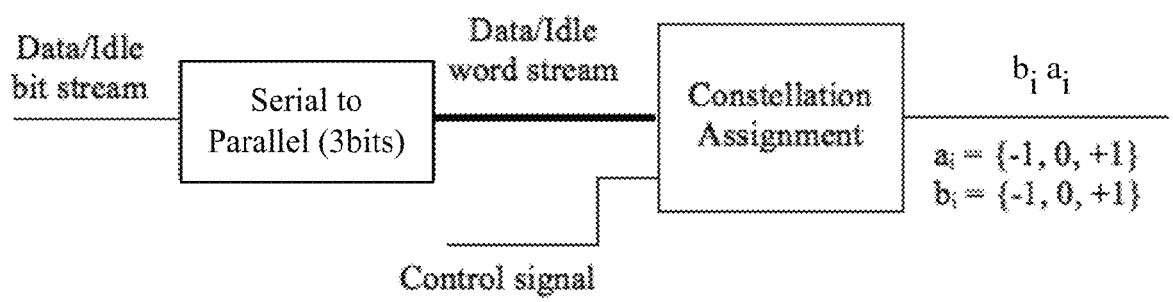

FIG. 7B shows the example 2D PAM3 constellation and an another embodiment of a corresponding modulator block diagram. As illustrated again, the 00 symbol is not used for data. As illustrated in the modulator block diagram, a 3-bits are used to map to one of the 8 non-zero points in the 2D PAM3 symbol.

Figure 8:
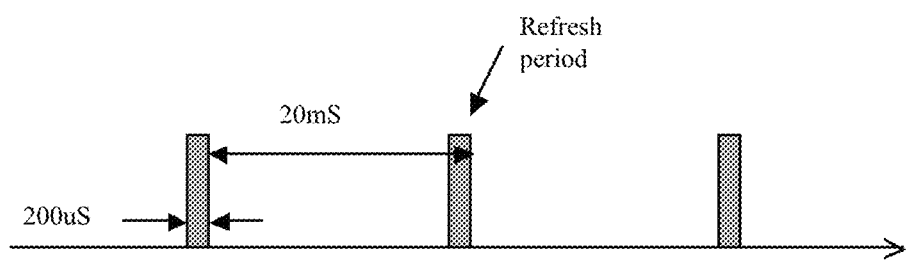
FIG. 8 illustrates an example of energy efficient Ethernet (EEE) idle mode refresh cycles.

FIG. 8 illustrates a simplified diagram with refresh and silent periods used in an Ethernet system with EEE capability. Here, it should be noted that while the EEE format provides for Low Power Idle (LPI) mode, it does not necessarily reduces emission when peak interference into narrow band devices are measured.

Standard emission measurements for automotive networks use a 100 KHz resolution bandwidth when measuring emission in a frequency band of 30 MHz to 1000 MHz. A measurement filter with 100 KHz bandwidth averages the signal over about 10 us. With such a filter, the peak emission measured during idle mode corresponds to the refresh time of 200 us. The silent period of 20 ms does not help with peak emission in this case. In order to reduce peak emission, the complete cycle of refresh and silent periods needs to be less than 10 us. To get low emission over larger bandwidths (e.g., 1 MHz), refresh cycles are ideally even shorter.

In the present disclosure, it is recognized that multi-dimensional modulation schemes such as those described above (e.g., 4D 17-Point modulation) can be used where zero symbols are sent during silent periods. It is a feature of the present disclosure that the transient between data and idle modes is smooth as zero is part of the defined signal constellation.

With zero being part of the signal constellation, the receiver can be configured to automatically go in and out of low emission idle (LEI) mode with no need for further coordination between the two sides of a link. In one embodiment, the receiver adaptation can be automatically frozen when zero symbols arrive and continue adapting when non-zero symbols are received. This allows for very short cycles of refresh signals as shown in FIG. 7 with no need for extra signaling.

With fast refresh cycles, the signal energy is effectively averaged out in the measurement filter. The peak emission during LEI mode is reduced by:

Peak Emission reduction in dB=10*log(refresh_cycle/refresh_time)

Figure 9:
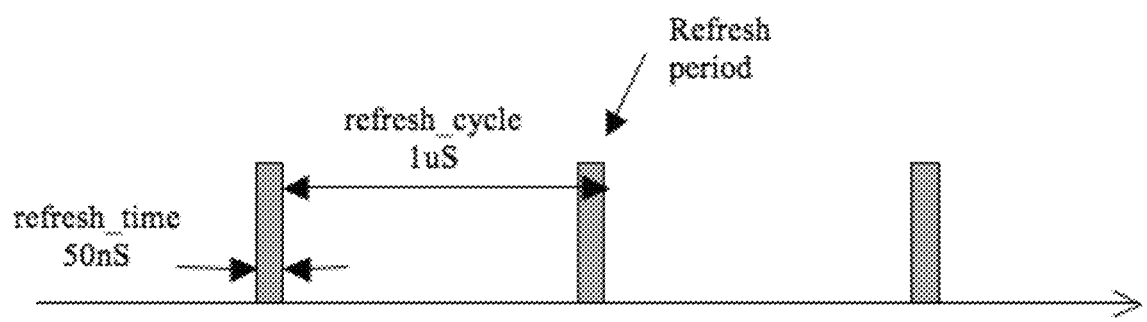
FIG. 9 illustrates an example of fast refresh cycles for low emission idle (LEI) mode.

For the example assignment shown in FIG. 9, peak emission is reduced by 10*log (1 us/50 ns)=13 dB during idle mode when measured on 100 KHz resolution bandwidth. As would be appreciated, the principles of the present disclosure are not dependent on particular values of the refresh cycle and the refresh time. The particular values chose can vary based on a given implementation.

Refresh cycles are considered fast if they are sufficiently shorter than the inverse of the measurement bandwidth. This bandwidth represents the bandwidth of narrow band devices that can be affected by signal emission.

Special unused words from the signal constellation can be used for transition from the data mode into LEI mode and from LEI mode to the data mode. In the example of using a 4D 17-Point constellation, +1 −1 +1 −1 0 0 0 0 may be used to indicate transition into LEI mode and 0 0 0 0 −1 +1 −1 +1 may be used to indicate transition out of LEI mode and into data mode. In another example of a 2D 9-Point constellation, +1 −1 0 0 may be used to indicate transition into LEI mode and 0 0 −1 +1 may be used to indicate transition out of LEI mode and into the data mode. Here, it should be noted that the two consecutive symbols in the examples of the 4D 17-Point constellation or the 2D 9-Point constellation would represent one word and combinations not used in the data mode.

Figure 10:
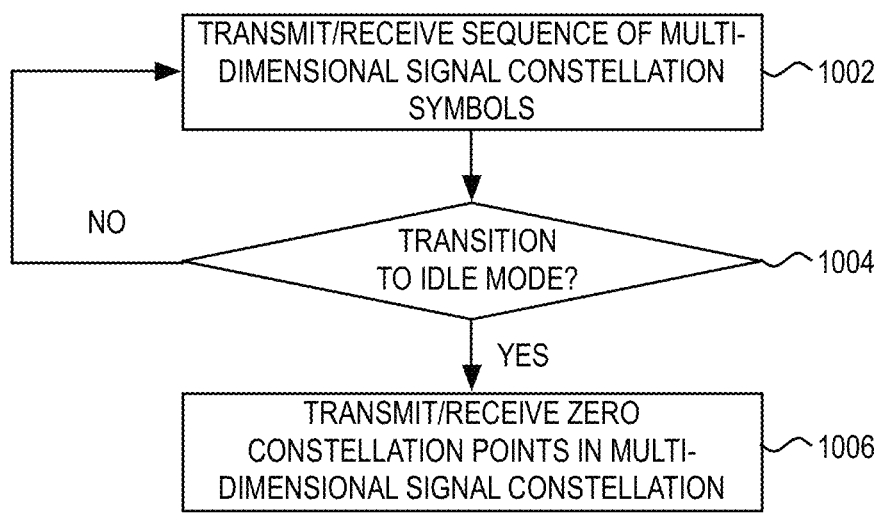
FIG. 10 illustrates an example of a flowchart of an example process.

Having described a general framework for using multi-dimensional modulation schemes with high noise immunity and LEI signaling, reference is now made to the FIG. 10, which illustrates a flowchart of an example process. As illustrated, the process begins at step 1002 where a PHY device transmits/receives a sequence of one or more multi-dimensional signal constellation symbols.

As noted above, the total signal space of constellation points can be divided into a first subset that is used for data, a second subset that is used for control signals, and the zero constellation point that is used during idle periods. At step 1004, the transmitted/received sequence of one or more multi-dimensional signal constellation symbols can be used to indicate a need to transition from the data mode to an idle mode.

When the transmitted/received sequence of one or more multi-dimensional signal constellation symbols does not indicate a need to transition to the idle mode at step 1004, then the process would continue back to step 1002 where additional sequences of one or more multi-dimensional signal constellation symbols are transmitted/received.

When the transmitted/received sequence of one or more multi-dimensional signal constellation symbols does indicate a need to transition to the idle mode at step 1004, then the PHY device can effect a transition to an idle mode. During the low power state, the PHY device would then transmit/receive zero constellation points in the multi-dimensional signal constellation at step 1006. As would be appreciated, a particular sequence of one or more multi-dimensional signal constellation symbols can also be used to signal a transition form the idle mode back to the data mode.

Although one of the primary goals for LEI mode is to reduce emission during the idle mode, it is possible to design the digital and analog modules to consume less power when zero signals are being sent or received. In such a scenario, the designs would ensure that unstable or noisy transients are not produced when going in and out of LEI mode.

As has been described, a multi-dimensional modulation scheme with an EMC-constraint can be produced that provides very high noise immunity and an extra zero constellation point needed for PHY control messages and implementation of LEI mode. Significantly the multi-dimensional modulation scheme can be designed such that it does not reduce the minimum Euclidean distance of signals and does not increase signal bandwidth.

It should be noted that no refresh period is needed if the Inter Packet Gap (IPG) is less than the refresh cycles. For a full duplex link, it is possible that in one direction there is continuous data traffic while data traffic is low in another direction. This can be the case, for example, if a video camera is connected through the link. The LEI mode may be used in one direction while the other direction is sending data.

It should be noted that while the above-description includes examples of a 4D 17-Point constellation and a 2D 9-Point constellation, such examples are not intended to be limiting. Other multi-dimensional constellations can be used that include the features of the present disclosure noted above.

Another embodiment of the disclosure may provide a machine and/or computer readable storage and/or medium, having stored thereon, a machine code and/or a computer program having at least one code section executable by a machine and/or a computer, thereby causing the machine and/or computer to perform the steps as described herein.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the art by a review of the preceding detailed description. Although a number of salient features of the present disclosure have been described above, other embodiments are capable of being practiced and carried out in various ways that would be apparent to one of ordinary skill in the art after reading the present disclosure, therefore the above description should not be considered to be exclusive of these other embodiments. Also, it is to be understood that the phraseology and terminology employed herein are for the purposes of description and should not be regarded as limiting.

What is claimed is:

1. A method, comprising:
    transmitting, from a first device to a second device, data using a multi-dimensional signal constellation; and
    transmitting, from the first device to the second device, during an idle mode, a zero constellation point in the multi-dimensional signal constellation and a refresh signal, wherein a duration of the refresh signal is less than a time interval for determining a peak emissions value, and wherein the time interval is defined by a resolution bandwidth of a measurement filter used in determining the peak emissions value.

2. The method of claim 1, further comprising, transmitting, from the first device to the second device, a constellation point in the multi-dimensional signal constellation, which is not used for sending data, to signal a transition from a data mode to the idle mode.

3. The method of claim 1, wherein the multi-dimensional signal constellation is a 4D 17-point signal constellation.

4. The method of claim 1, wherein the multi-dimensional signal constellation is a 2D 9-point signal constellation.

5. The method of claim 1, further comprising transmitting, from the first device to the second device, a non-zero constellation point in the multi-dimensional signal constellation to facilitate a refresh of a receiver.

6. The method of claim 1, wherein the zero constellation point is transmitted during a quiet portion of the idle mode, and a duration of the quiet portion plus the duration of the refresh signal is equal to or less than the time interval.

7. The method of claim 6, wherein the duration of the quiet portion plus the duration of the refresh signal is less than 200 microseconds.

8. The method of claim 7, wherein the duration of the quiet portion plus the duration of the refresh signal is less than 100 microseconds.

9. The method of claim 1, wherein the duration of the refresh signal is less than 200 microseconds.

10. The method of claim 9, wherein the duration of the refresh signal is less than 100 microseconds.

11. The method of claim 10, wherein the duration of the refresh signal is less than 10 microseconds.

12. The method of claim 1, wherein the zero constellation point is transmitted during a quiet portion of the idle mode, the quiet portion and the refresh signal together comprise a refresh cycle, and a ratio of a duration of the refresh cycle to the duration of the refresh signal is approximately 20.

13. A method, comprising:
    receiving, at a first device from a second device, a sequence of one or more multidimensional signal constellation symbols;
    identifying, based on the received sequence of one or more multi-dimensional signal constellation symbols, a transition from a data mode to an idle mode, wherein the received sequence of one or more multi-dimensional signal constellation symbols includes a constellation point in the multi-dimensional signal constellation, which is not used for sending data;
    receiving a zero constellation point in the multi-dimensional signal constellation during a quiet portion of the idle mode; and
    receiving a refresh signal;
    wherein the quiet portion and the refresh signal together comprise a refresh cycle, and a ratio of a duration of the refresh cycle to a duration of the refresh signal is equal to or greater than approximately twenty; and
    wherein the duration of the refresh signal is less than a time interval for determining a peak emissions value.

14. The method of claim 13, further comprising freezing adaptation of receiving in the first device during the idle mode.

15. The method of claim 13, wherein the multi-dimensional signal constellation is a 4D 17-point signal constellation.

16. The method of claim 13, wherein the multi-dimensional signal constellation is a 2D 9-point signal constellation.

17. The method of claim 13, further comprising receiving, at the first device from the second device, a non-zero constellation point in the multi-dimensional signal constellation to facilitate a refresh of a receiver.

18. The method of claim 13, wherein the received sequence of one or more multidimensional signal constellation symbols consists of a single multi-dimensional constellation symbol.

19. The method of claim 13, wherein the received sequence of one or more multidimensional signal constellation symbols is two or more multi-dimensional signal constellation symbols.

20. A device, comprising:
a modulator that is configured to assign data to constellation points in a multidimensional signal constellation; and
a transmitter that is configured to transmit data to a receiver using constellation points assigned to data in a data mode, transmit a zero constellation point in the multidimensional signal constellation during a quiet portion of an idle mode, and transmit a refresh signal;
wherein a duration of the refresh signal is less than a time interval for determining a peak emissions value.

21. The device of claim 20, wherein the modulator is configured to assign a control signal for a transition from the data mode to the idle mode to a constellation point in the multidimensional signal constellation that is not used for sending data.

22. The device of claim 20, wherein the multi-dimensional signal constellation is a 4D 17-point signal constellation.

23. The device of claim 20, wherein the multi-dimensional signal constellation is a 3D 9-point signal constellation.

24. The device of claim 20, wherein the transmitter is further configured to transmit a non-zero constellation point in the multi-dimensional signal constellation to facilitate a refresh of the receiver.

* * * * *